US011933531B2

United States Patent
Hoelter et al.

(10) Patent No.: US 11,933,531 B2
(45) Date of Patent: Mar. 19, 2024

(54) MOTORIZED BALANCED CRYOCOOLER EXPANDER SYSTEMS AND METHODS

(71) Applicant: Teledyne FLIR Commercial Systems, Inc., Goleta, CA (US)

(72) Inventors: Theodore R. Hoelter, Santa Barbara, CA (US); Andreas Fiedler, Santa Barbara, CA (US); Tadashi Horikiri, Santa Barbara, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 405 days.

(21) Appl. No.: 17/214,760

(22) Filed: Mar. 26, 2021

(65) Prior Publication Data

US 2021/0215402 A1 Jul. 15, 2021

Related U.S. Application Data

(63) Continuation of application No. PCT/US2019/052511, filed on Sep. 23, 2019.

(60) Provisional application No. 62/738,913, filed on Sep. 28, 2018.

(51) Int. Cl.
*F25B 9/14* (2006.01)
*F25B 49/02* (2006.01)

(52) U.S. Cl.
CPC .............. *F25B 9/14* (2013.01); *F25B 49/025* (2013.01); *F25B 2309/001* (2013.01); *F25B 2309/1428* (2013.01); *F25B 2500/13* (2013.01); *F25B 2500/18* (2013.01); *F25B 2700/2115* (2013.01)

(58) Field of Classification Search
CPC .. F25B 9/14; F25B 2309/001; F25B 2500/13; F25B 49/025
See application file for complete search history.

(56) References Cited

U.S. PATENT DOCUMENTS

| 4,822,390 | A | * | 4/1989 | Kazumoto | ............ | F04B 35/045 60/520 |
| 5,412,951 | A | | 5/1995 | Wu | | |
| 5,531,074 | A | * | 7/1996 | Katagiri | ................... | F25B 9/14 250/352 |

(Continued)

OTHER PUBLICATIONS

Yang et al., "A Novel Vibration Control System for Stirling Cryocoolers", SPIE, vol. 6835-6850E-1, XP040432160, Jan. 1, 2008, 11 pages.

*Primary Examiner* — Brian M King
(74) *Attorney, Agent, or Firm* — Haynes and Boone, LLP

(57) ABSTRACT

Techniques are disclosed for systems and methods to reduce mechanical vibrations within a cryocooler/refrigeration system configured to provide cryogenic and/or general cooling of a device or sensor system. A cryocooler includes a motor driver controller configured to receive operational parameters and generate motor driver control signals and/or balancer system control signals based, at least in part, on the received operational parameters, and a motor driver configured to receive the control signals and generate drive signals to drive a motor and/or a balancer system of the cryocooler. The cryocooler includes a motorized and/or actively balanced expander configured to drive and/or balance motion of a displacer of the expander. The expander includes a magnet ring fixed to the displacer and a motor coil disposed within a cylinder head of the motorized and/or actively balanced expander.

20 Claims, 10 Drawing Sheets

(56) References Cited

U.S. PATENT DOCUMENTS

| | | | | |
|---|---|---|---|---|
| 6,131,394 A | * | 10/2000 | Lavietes | G10K 11/17813 |
| | | | | 62/55.5 |
| 2008/0282694 A1 | * | 11/2008 | Kitamura | F02G 1/0435 |
| | | | | 60/517 |
| 2015/0041619 A1 | * | 2/2015 | Ellis | F16F 1/324 |
| | | | | 248/603 |
| 2019/0078818 A1 | * | 3/2019 | Khaled | F25B 49/022 |

\* cited by examiner

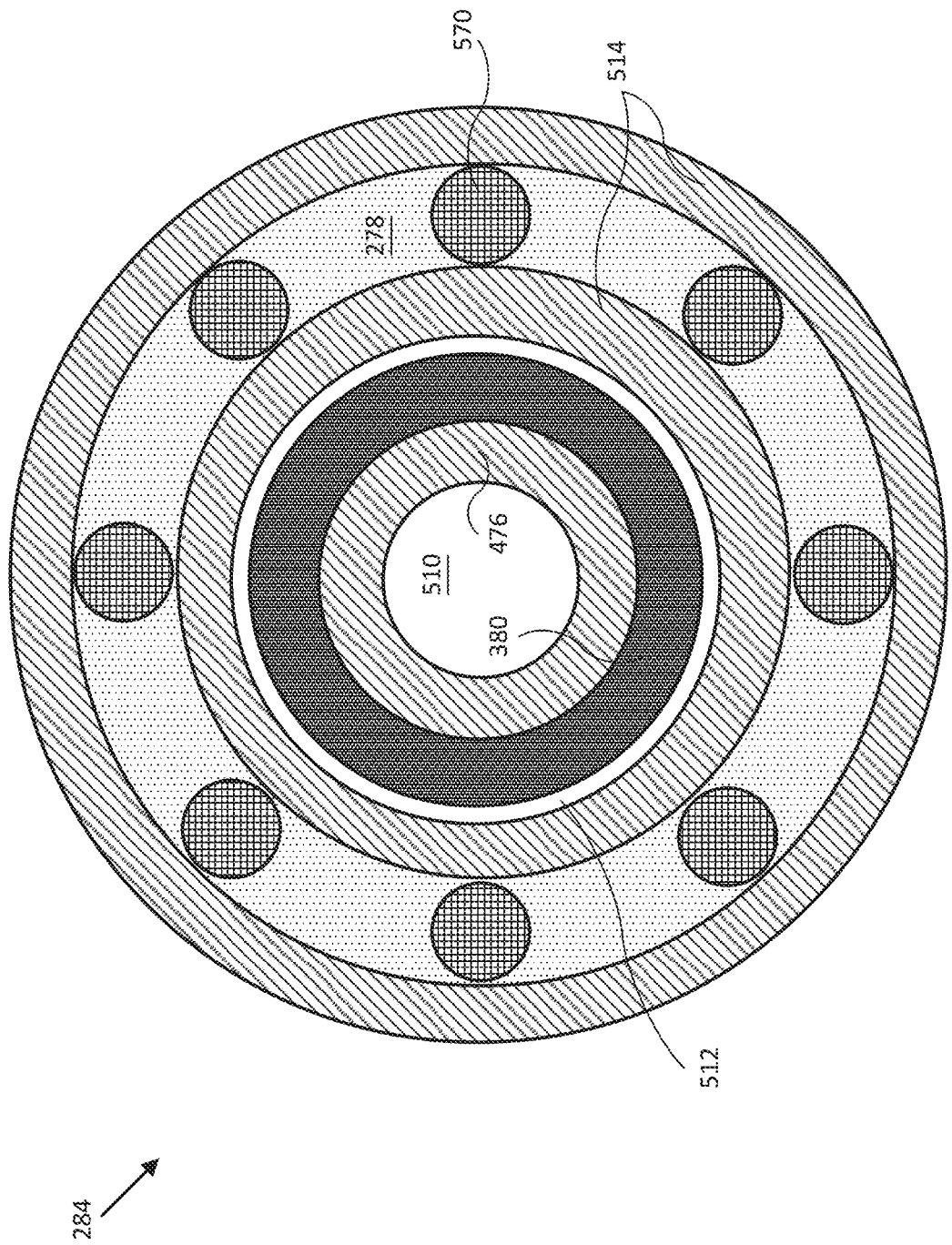

MOTORIZED BALANCED CRYOCOOLER EXPANDER SYSTEMS AND METHODS

CROSS-REFERENCE TO RELATED APPLICATIONS

This application is a continuation of International Patent Application No. PCT/US2019/052511 filed Sep. 23, 2019 and entitled "MOTORIZED BALANCED CRYOCOOLER EXPANDER SYSTEMS AND METHODS", which is incorporated herein by reference in its entirety.

International Patent Application No. PCT/US2019/052511 claims the benefit of and priority to U.S. Provisional Patent Application No. 62/738,913 filed Sep. 28, 2018 and entitled "MOTORIZED BALANCED CRYOCOOLER EXPANDER SYSTEMS AND METHODS" which is hereby incorporated by reference in its entirety.

TECHNICAL FIELD

One or more embodiments of the invention relate generally to cryogenic refrigeration devices and more particularly, for example, to motorized expanders for refrigeration systems and methods.

BACKGROUND

Cryogenic refrigeration systems, or cryocoolers, are typically used to cool other devices to temperatures approaching or below approximately 120 Kelvin, and, more generally, can be used to cool devices to between 200 and 60 Kelvin, for example, depending on the overall heat load presented by a particular device. Such cooled devices are often one of a variety of different types of sensor systems that operate better (e.g., produce measurements with less noise, higher sensitivity, higher accuracy, higher responsiveness, and/or with other generally more desirable performance metrics) when cooled. For example, one such category of sensor systems that can benefit from being cooled includes infrared cameras (e.g., including a focal plane array (FPA) of individual infrared sensors), which measure or capture infrared (e.g., thermal) emissions from objects as infrared/thermal images and/or video. Cooling such infrared cameras generally increases detector sensitivity (e.g., by decreasing thermal noise intrinsic to the individual infrared sensors), which can result in overall more accurate and reliable infrared imagery.

Cryocoolers for use with infrared cameras can be quite small (e.g., designed to fit within a volume of approximately 3×3×2 inches, or less), yet be able to provide sufficient cooling power (e.g., a measure, typically in Watts, of a refrigerator's ability to extract heat from a coupled device) to cool at least portions of an infrared camera to the range of temperatures desired for, for example, relatively low noise thermal imagery, while experiencing the thermal load typical of an operating infrared camera. Vibrations generated by motors driving such cryocoolers, and conventional vibration mitigation techniques, can under some circumstances have substantial negative impact on the weight, cost, and overall performance of the cryocooler and/or sensor system. Moreover, reductions in system size and weight can be helpful to facilitate various compact system applications, including integration with a flight platform.

Thus, there is a need in the art for a relatively compact and vibration-free cryocooler that is able to maintain or increase overall system performance, at least with respect to vibration amplitude and system size, relative to conventional systems.

SUMMARY

Techniques are disclosed for systems and methods to reduce mechanical vibrations within a cryocooler/refrigeration system configured to provide cryogenic and/or general cooling of a device or sensor system.

In one embodiment, a system may include a motor driver controller configured to receive operational parameters corresponding to operation of a cryocooler controlled by the cryocooler controller and generate motor driver control signals and/or balancer system control signals based, at least in part, on the received operational parameters, and a motor driver configured to receive the motor driver control signals and/or the balancer system control signals from the motor driver controller and generate drive signals based, at least in part, on the motor driver control signals and/or the balancer system control signals, to drive a motor and/or a balancer system of the cryocooler. The cryocooler may include a motorized and/or actively balanced expander configured to drive and/or balance motion of a displacer of the motorized and/or actively balanced expander. The motorized and/or actively balanced expander may include a magnet ring fixed to the displacer and a motor coil disposed within a cylinder head of the motorized and/or actively balanced expander.

In another embodiment, a method may include receiving operational parameters corresponding to operation of a cryocooler controlled by a cryocooler controller; generating motor driver control signals and/or balancer system control signals based, at least in part, on the received operational parameters; and generating, by a motor driver of the cryocooler controller, drive signals based, at least in part, on the motor driver control signals and/or balancer system control signals, to drive a motor and or a balancer system of the cryocooler. The cryocooler may include a motorized and/or actively balanced expander configured to drive and/or balance motion of a displacer of the motorized and/or actively balanced expander. The motorized and/or actively balanced expander may include a magnet ring fixed to the displacer and a motor coil disposed within a cylinder head of the motorized and/or actively balanced expander.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 5B illustrates a cross section of a balancer system for an actively balanced expander of a refrigerator/cryocooler in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, compact and powerful refrigeration systems and methods may advantageously employ an actively balanced and/or motorized expander. For example, an actively balanced and/or motorized expander may include a transducer or balancer system integrated with a displacer for the expander and disposed within a cylinder head of the expander so as not to increase in overall length of the expander, relative to alternative passive expanders requiring a passive spring and bounce space within the cylinder head to allow the expander to operate in a typical Stirling cycle. The balancer system may include an active spring system that may be controlled to allow a motor coil suspended by the active spring system within the cylinder head of the expander to both drive the displacer for the expander and compensate for vibrations caused by motion of the displacer within the expander.

By integrating the balancer system with the displacer for the actively balanced expander, embodiments of the actively balanced expander can be configured to reduce vibrations transmitted to a coupled electronic device (e.g., a cooled infrared camera) while substantially maintaining the compactness and cooling power of the refrigeration system. The increased performance and flexibility of the constituent refrigeration systems, relative to systems employing relatively large vibration mitigation techniques, allows coupled cooled sensor systems to operate according to higher performance characteristics than achievable with conventional refrigeration systems, particularly where compactness is at a premium, such as in applications involving spaceflight, unmanned aircraft systems, relatively large and/or high power-dissipating sensor systems, and/or battery or solar powered systems.

For example, infrared cameras may be used for nighttime or other applications when ambient lighting is poor or when environmental conditions are otherwise non-conducive to visible spectrum imaging, and they may also be used for applications in which additional non-visible-spectrum information about a scene is desired, such as for gas leak detection. In each application, it is typically desirable to reduce noise and variability in images captured by the infrared camera by cooling at least a focal plane array (FPA) of the infrared camera to a cryogenic and/or relatively stable temperature while the images are captured. It is also typically desirable to minimize system vibrations that can cause heating, blurring, and/or interference with operation of the infrared camera. The reduced vibrations provided by embodiments of the present disclosure result in lower noise and/or blur in resulting infrared imagery and more reliable and accurate infrared images (e.g., in particular, thermal images).

Figure 1:
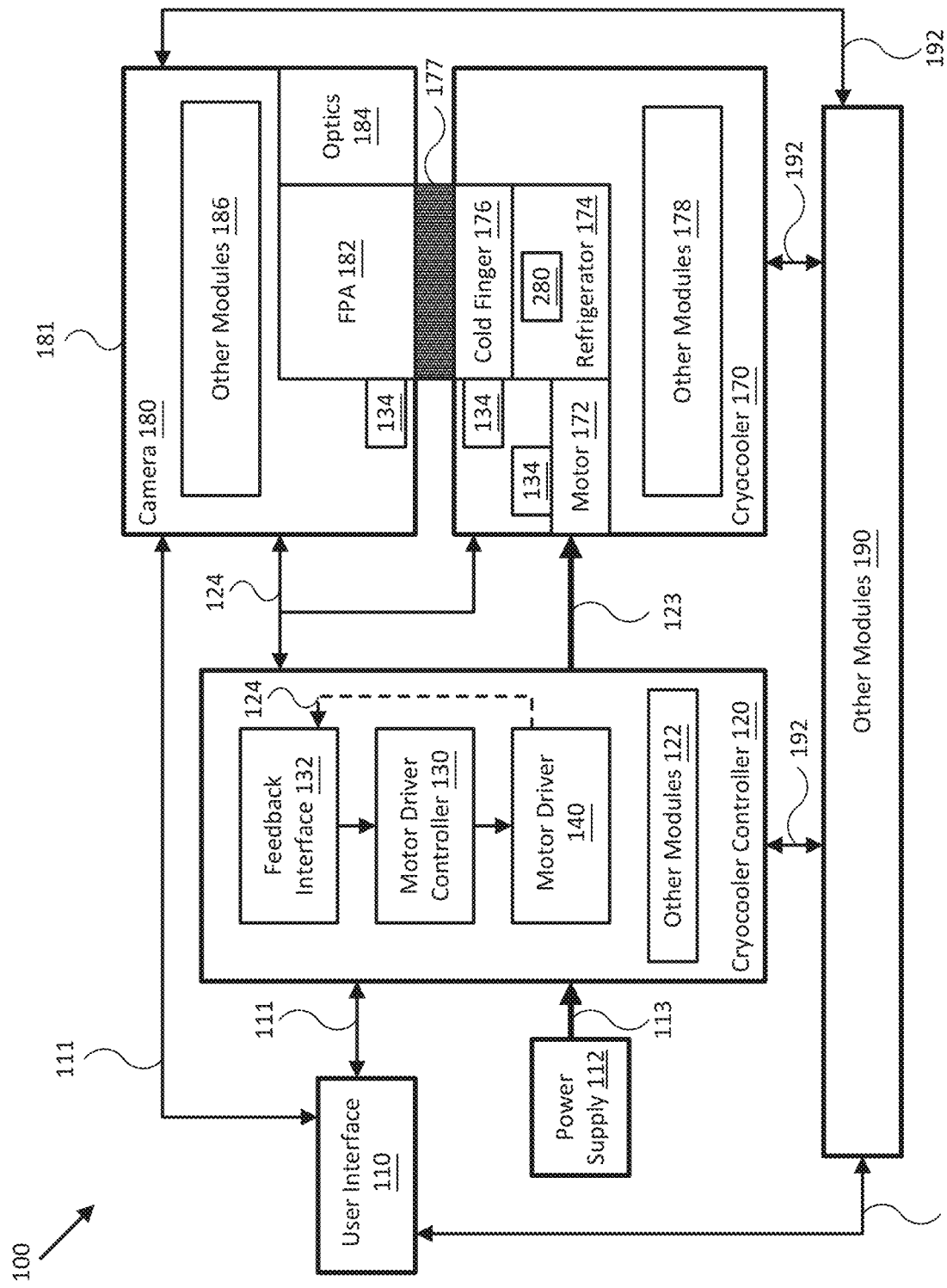
FIG. 1 illustrates a block diagram of a refrigeration system including an actively balanced expander in accordance with an embodiment of the disclosure.

FIG. 1 illustrates a block diagram of a refrigeration system 100 including an actively balanced expander/refrigerator 174 in accordance with an embodiment of the disclosure. As shown in FIG. 1, refrigeration system 100 includes power supply 112 providing an input power signal over power leads 113 to cooler controller 120, which then provides motor drive signals and/or balancer system drive signals over power leads 123 to drive motor 172 and/or transducer/balancer system 280 of cryocooler 170. In general, cryocooler 170 operates to cool cold finger 176, which is thermally coupled to and configured to cool/extract heat from at least a portion (e.g., FPA 182) of electronic device/sensor/camera 180 through thermal interface 177. As shown in FIG. 1, cryocooler controller 120 may be configured to receive various sensor signals (e.g., corresponding to an input voltage of the input power signal provided by power supply 112, an output voltage of motor drive signals generated by motor driver 140/cryocooler controller 120, temperatures of various components of refrigeration system 100 measured by temperature sensors 134, and/or other sensor signals corresponding to operation of cryocooler 170, transducer/balancer system 280, and/or other elements of refrigeration system 100) as feedback of operation of cryocooler 170 and/or other elements of refrigeration system 100, and to adjust drive signals provided to motor 172 and/or transducer/balancer system 280 accordingly (e.g., so as provide a stable and/or desired temperature and/or cooling power with relatively little mechanical vibration at cold finger 176).

Also shown in FIG. 1 is user interface 110. User interface 110 may be implemented as a personal computer, a tablet, a smart phone, a mobile computing device and/or vehicle interface, and/or one or more of a display, a touch screen, a keyboard, a mouse, a joystick, a knob, button, or switch, and/or any other device capable of accepting user input and/or providing feedback to a user. More generally, user interface 110 may be configured to provide user-level control of refrigeration system 100 and to provide operational feedback to a user of system 100.

User interface 110 may be integrated with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of system 100. In addition, user interface 110 may include a machine readable medium provided for storing non-transitory instructions for loading into and execution by user interface 110. In these and other embodiments, user interface 110 may be implemented with other components where appropriate, such as volatile memory, non-volatile memory, and/or various analog and/or digital components for interfacing with devices of system 100.

In various embodiments, user interface 110 may be configured to provide an initialization signal to cryocooler controller 120 to begin operation of cryocooler 170, for example, or to provide a temperature set point and/or other operational parameters (e.g., corresponding to a desired operational state of cryocooler 170) to cryocooler controller 120. In specific embodiments, user interface 110 may be configured to provide and/or update configuration data, including logic-level configuration data, to cryocooler controller 120 to facilitate control of operation of cryocooler 170, as described herein. User interface 110 may also be configured to receive an operating temperature, power draw, efficiency, and/or other operating characteristic and/or measured feedback of operation of cryocooler 170 and/or other elements of refrigeration system 100 (e.g., from cryocooler controller 120 and/or other elements of system 100) and provide such information for display or indication to a user. In some embodiments, user interface 110 may be configured to receive infrared images captured by camera 180 (e.g., over data leads 111) and provide the infrared images for display to a user.

Power supply 112 may be implemented as a battery, solar cell, mechanical generator, and/or other power generating and/or delivery device, which may be provided specifically to power refrigeration system 100, for example, and/or be coupled to, integrated with, or generated as part of the operation of a separate platform, such as a sensor, vehicle, aircraft, watercraft, or other fixed or mobile platform. In some embodiments, power supply 112 may be configured to provide an input DC power signal over power leads 113, such as a 12V, 40V, 48V, or other voltage level DC power signal. More generally, power supply 112 may be configured to provide any type of input power signal over power leads 113 that can be converted by cryocooler controller 120 into motor drive signals and/or balancer system drive signals appropriate to drive motor 172 and/or transducer/balancer system 280.

As shown in FIG. 1, cryocooler controller 120 includes motor driver controller 130, feedback interface 132, motor driver 140, and optional other modules 122. In additional embodiments, such as where cryocooler 170 includes multiple motors, cryocooler controller 120 may be implemented with multiple motor drivers, for example, that may each be controlled independently by motor driver control signals generated by motor driver controller 130.

Motor driver controller 130 may be implemented as any appropriate logic device (e.g., processing device, microcontroller, processor, ASIC, FPGA, memory storage device, memory reader, or other device or combinations of devices) that may be adapted to execute, store, and/or receive appropriate instructions, such as software instructions implementing a control loop for controlling various operations of cryocooler 170 and/or other components of system 100. For example, motor driver controller 130 may be configured to receive operational parameters corresponding to operation of cryocooler 170 and generate motor driver control signals configured to control operation of motor driver 140 based, at least in part, on the received operational parameters.

In addition, motor driver controller 130 may include a machine readable medium provided for storing data and/or non-transitory instructions for loading into and execution by motor driver controller 130. In these and other embodiments, motor driver controller 130 may be implemented with other components where appropriate, such as volatile memory, non-volatile memory, and/or various analog and/or digital components for interfacing with devices of system 100. In a particular embodiment, motor driver controller 130 may be implemented substantially entirely by a programmable logic device (PLD), such as an FPGA, which may be configured to implement (e.g., using programmable resources) and perform any of the methods described herein. In such embodiments, user interface 110 may be configured to provide/update configuration data over data leads 111 to motor driver controller 130 that is configured to implement/update/modify such methods in programmable resources and/or other elements of motor driver controller 130.

Motor driver 140 may be implemented by one or more electrical components, such as various electrically controllable switches/transistors, an inductor, and a capacitor, that are configured to receive motor driver control signals and/or balancer system drive signals from motor driver controller 130 and to generate drive signals based, at least in part, on the motor driver control signals and/or the balancer system drive signals, to drive motor 172 and/or transducer/balancer system 280 of cryocooler 170.

Feedback interface 132 may be implemented by one or more of a multichannel analog to digital converter, a reference signal source, a temperature sensor, a digital communication interface, and/or other electrical or electronic components configured to receive and/or measure sensor signals corresponding to operation of cryocooler 170 and/or other elements of system 100 (e.g., over sensor leads 124) and convert such sensor signals into corresponding feedback data indicative of an operational state of cryocooler 170 and/or other elements of system 100. Feedback interface 132 may be configured to provide such feedback data to motor driver controller 130 to help adjust operation of cryocooler 170 and/or other elements of system 100 according to various desired operational characteristics or states of cryocooler 170 and/or other elements of system 100.

For example, feedback interface 132 may be configured to receive one or more sensor signals (e.g., from temperature sensor 134) and generate feedback data corresponding to operation of cryocooler 170, and motor driver controller 120 may be configured to receive the feedback data from feedback interface 132 and generate motor driver control signals and/or balancer system drive signals based, at least in part, on the feedback data. In some embodiments, one or more of temperature sensors 134 may be implemented as diodes with characteristic voltage/temperature responses. Feedback interface 132 may be configured to provide a reference current to a diode and to measure/digitize the resulting voltage developed across the diode, which is proportional to the temperature of the temperature sensor 134. Advantageously, such diodes may be integrated with FPA 182 of camera 180, for example, allowing direct and precise measurement and feedback of a temperature of FPA 182.

In some embodiments, the one or more sensor signals received by feedback interface 132 may include a measured temperature of cold finger 176 of cryocooler 170 and/or electronic device 180 thermally coupled to cryocooler 170 (e.g., via thermal interface 177). Corresponding feedback data may be provided to motor driver controller 120, which may be configured to determine a feedback error based, at least in part, on a set point corresponding to a desired temperature for cold finger 176 and/or electronic device 180 and the received feedback data. In such embodiments, motor driver controller 120 may be configured to generate motor driver control signals based, at least in part, on the determined feedback error.

In other embodiments, the one or more sensor signals received by feedback interface 132 may include a measured vibration amplitude of cold finger 176 of cryocooler 170 and/or electronic device 180 thermally coupled to cryocooler 170 (e.g., via thermal interface 177). Corresponding feedback data may be provided to motor driver controller 120, which may be configured to determine a constant or time varying amplitude, phase, and/or other drive signal characteristic based, at least in part, on a desired maximum vibration amplitude for cold finger 176 and/or electronic device 180 and the received feedback data. In such embodiments, motor driver controller 120 may be configured to generate balancer system driver control signals based, at least in part, on the determined feedback error.

More generally, motor driver controller 120 may be configured to determine the feedback error, a ramp enable state corresponding to an operational state of cryocooler 170, and/or a ramp error based, at least in part, on feedback data (e.g., generated by feedback interface 132) corresponding to a measured temperature of cold finger 176 and/or electronic device 180, a measured input voltage of a power signal received by motor driver 140, a measured output voltage of drive signals generated by motor driver 140, and/or a measured temperature of cryocooler controller 120 (e.g., measured by feedback interface 132). In such embodiments, motor driver controller 120 may be configured to generate motor driver control signals based, at least in part, on the determined feedback error, ramp enable state, and/or ramp error. Optional other modules 122 may include various power, digital, and/or analog signal interfaces, sensors, and/or additional circuitry configured to facilitate operation of any element of cryocooler controller 120.

Cryocooler 170 may be implemented as any cooler or refrigeration system configured to convert electrical power delivered over power leads 123 to motor 172 into cooling power generated by refrigerator 174 at cold finger 176, and to convert balancer system drive signals delivered over power leads 123 to transducer/balancer system 280 into reduced vibrations at cold finger 176. In some embodiments, cryocooler 170 may be implemented as a Stirling refrigerator, for example, and in particular embodiments, as a miniature split-pair Stirling refrigerator, as described in more detail with reference to FIGS. 2A-B. As shown in FIG. 1, cryocooler 170 may include one or more temperature sensors 134 configured to provide sensor signals indicative of a measured temperature of a corresponding element of cryocooler 170 (e.g., of motor 172, for fault detection, or of cold finger 176, for operating temperature feedback) to feedback interface 132 of cryocooler controller 120. Optional other modules 178 may include additional temperature or electrical signal sensors, vibration sensors, various mechanical or thermal linkages, dewar cavities, working fluid reservoirs, and/or other mechanical or electrical components or sensors configured to facilitate operation of any element of cryocooler 170 and/or provide additional operational feedback to cryocooler controller 120.

As shown in FIG. 1, cryocooler 170 may be thermally coupled to electronic device/sensor/camera 180 via thermal interface 177. For example, thermal interface 177 may be implemented by thermal grease, thermal tape, copper or aluminum plate or film, and/or other materials and/or structures configured to provide a reliable and highly thermally conductive link between cryocooler 170 and at least a portion of electronic device/sensor/camera 180. Electronic device/sensor/camera 180 may be any device, sensor, or imaging device that operates better (e.g., with higher signal to noise operational characteristics and/or with higher performance according to other performance metrics) when cooled.

For example, electronic device/camera 180 may include an infrared imaging sensor implemented as FPA 182, which may be coupled to optics 184 and be configured to image infrared radiation (e.g., including thermal radiation) emitted from a scene in view of optics 184. In some embodiments, cryocooler 170 may be directly coupled (e.g., via thermal interface 177) to a sensor (e.g., /FPA 182) of electronic device/camera 180 and primarily be configured to cool such sensor. In other embodiments, cryocooler 170 may be coupled to various elements of electronic device/camera 180 (e.g., optics 184, camera body 181, and/or other modules 186) and be configured to cool such various elements to help increase performance of electronic device/camera 180.

As shown in FIG. 1, electronic device/camera 180 may include one or more temperature sensors 134 configured to provide sensor signals indicative of a measured temperature of a corresponding element of electronic device/camera 180 (e.g., of FPA 182, for operating temperature feedback) to feedback interface 132 of cryocooler controller 120. Optional other modules 186 may include additional temperature or electrical signal sensors, FPAs of sensors sensitive to different spectrums (e.g., visible light), other optical elements, and/or other mechanical or electrical components or sensors configured to facilitate operation of any element of electronic device/camera 180 and/or provide additional operational feedback to cryocooler controller 120.

Also shown in FIG. 1 is optional other module 190 of system 100 coupled to user interface 120 over data leads 111 and to other elements of system 100 over leads 192. other modules 190 may include additional sensors, additional temperature or electrical signal sensors, an actuated gimbal and associated control subsystem to aim electronic device/camera 180 according to a desired direction, an accelerometer, a gyroscope, a global navigation satellite system receiver, a compass, other orientation and/or position sensors, vibration sensors, thermal management subsystems, structural support, thermal and/or electrical shielding, and/or other mechanical or electrical components or sensors configured to facilitate operation of any element of refrigeration system 100 and/or provide additional operational feedback to cryocooler controller 120.

Figure 2A:
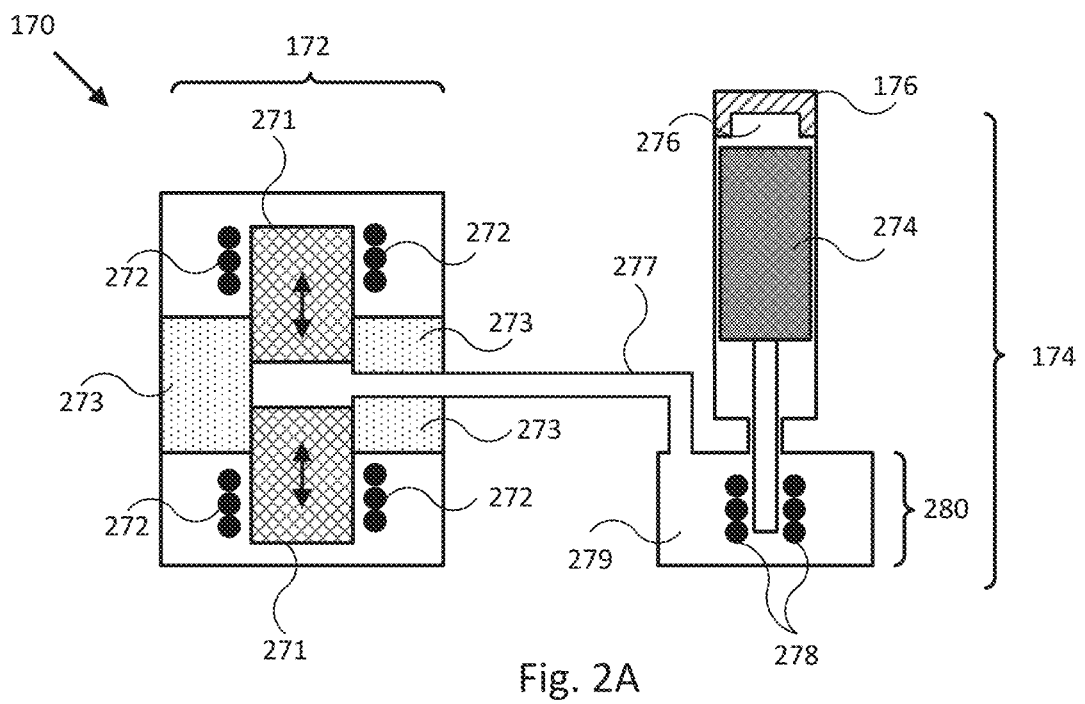
FIG. 2A illustrates a block diagram of a split-pair Stirling refrigerator/cryocooler including an actively balanced expander in accordance with an embodiment of the disclosure.

FIG. 2A illustrates a block diagram of a split-pair Stirling refrigerator/cryocooler 170 including transducer/balancer system 280 of actively balanced expander 174 of FIG. 1 in accordance with an embodiment of the disclosure. In the embodiment shown in FIG. 2A, cryocooler 170 includes motor/compressor 172 in fluid communication with actively balanced refrigerator/expander 174 via gas transfer line/tube 277. In general operation, motor/compressor 172 may be energized by motor driver 140 to compress working gas within the compression space (e.g., between pistons 271) and deliver a compression wave/mass flow of working gas through gas transfer line 277 to refrigerator 174. Heat in the working gas generated at least in part by the compression is extracted at the motor/compressor 172 and dissipated into the environment, rather than injected into expander 174.

The compression wave/mass flow causes regenerator/displacer 274 to move towards cold finger 176 and through inductive windings 278 within cylinder head 279, and at least a portion of the working gas travels through porous regenerator/displacer 274 and into expansion space 276. A restoring force provided by transducer/balancer system 280 and inductive windings 278, and the draw-back of pistons 271 (as controlled by drive signals provided by motor driver 140) in between compression strokes draws regenerator/displacer 274 back towards cylinder head 279 and expands the working gas within expansion space 276, thereby extracting heat from the environment through cold finger 176 and embedding it within the expanded working gas. Repeated operation of such cycle moves heat extracted from cold finger 176 (e.g., and anything thermally coupled to cold finger 176) to motor/compressor 172, and the transferred heat is dissipated into the environment (e.g., using various heat exchangers and thermal management coupled to motor/compressor 172), as is common with various Stirling cycle refrigeration systems.

As shown in FIG. 2A, motor/compressor 172 may be implemented with inductive windings 272 configured to cause pistons 271 to move towards each other to compress gas within the compression space therebetween. In some embodiments, motor driver 140 of cryocooler controller 120 may be electrically coupled to windings 272 of motor/compressor 172 (e.g., over power leads 123) and the motor drive signals generated by motor driver 140 may be used to drive pistons 271 to generate the compression wave/mass flow, as in a linear motor arrangement, as described herein. Other motor/compressor arrangements are contemplated, including various linear motor arrangements, other compressor arrangements, and/or cyclical motor and/or motor/compressor arrangements.

As also shown in FIG. 2A, actively balanced expander 174 may be implemented with inductive windings 278 configured to limit the stroke of displacer 274 (e.g., so as not to impact cold finger 176 or cylinder head 279) and to help balance motion of displacer 274 and/or compensate for the mechanical vibrations caused by reciprocation of displacer 274 within actively balanced expander 174. In some embodiments, motor driver 140 of cryocooler controller 120 (e.g., or an additional motor driver of cryocooler controller 120) may be electrically coupled to windings/coil 278 of actively balanced expander 174 (e.g., over power leads 123) and the balancer system drive signals generated by motor driver 140 may be used to drive displacer 274 and/or motion of windings/coil 278 as in a linear motor arrangement, similar in some aspects to operation of motor/compressor 172 described herein.

Figure 2B:
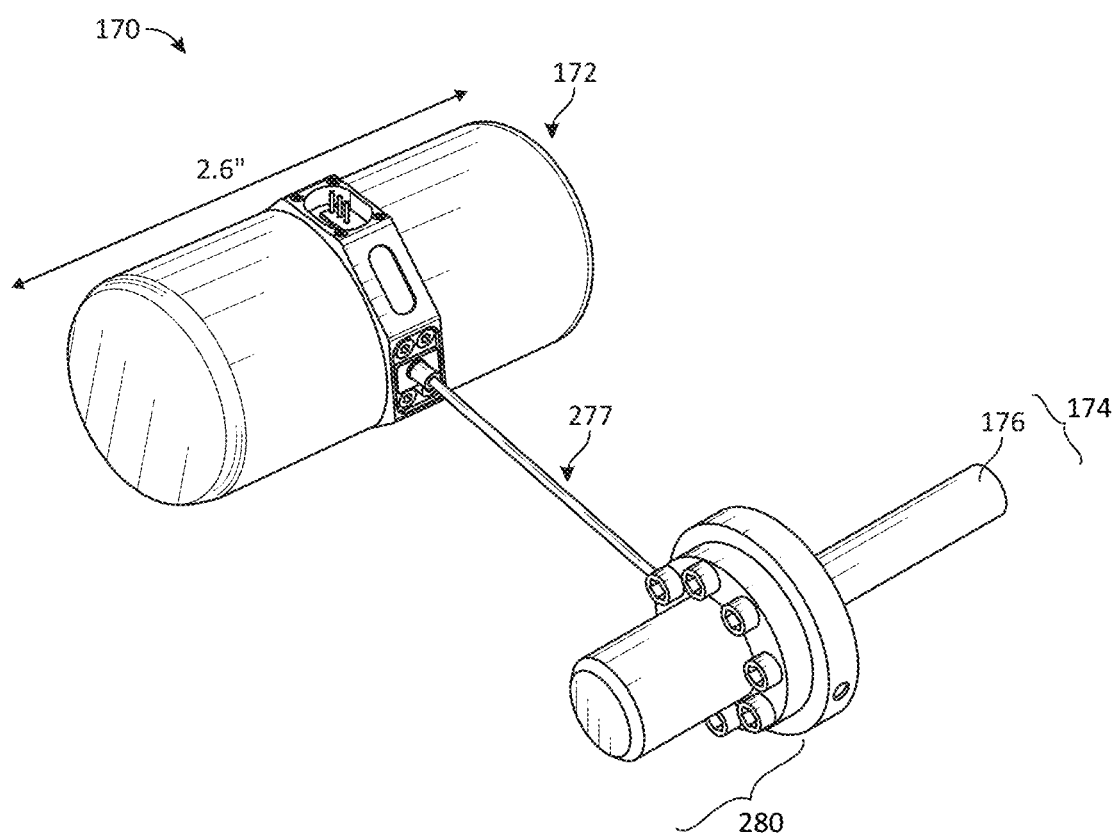
FIG. 2B illustrates an image of a split-pair Stirling refrigerator/cryocooler including an actively balanced expander in accordance with an embodiment of the disclosure.

FIG. 2B illustrates an image of a split-pair Stirling refrigerator/cryocooler 170 that may be controlled by cryocooler controller 120 of FIG. 1 in accordance with an embodiment of the disclosure. FIG. 2B illustrates the general size of a miniaturized cryocooler 170 that is analogous to cryocooler 170 of FIG. 2A and that may be used to cool FPA 182 of camera 180 in FIG. 1. For example, motor/compressor 172 may be approximately 2.6" in length, gas transfer line may be approximately the same length (e.g., or shorter or longer, depending on application needs), and displacer 174 with transducer/balancer system 280 may be approximately 2" in length with a cold finger diameter of approximately 0.5". In general, a cryocooler of a size and type similar to cryocooler 170 of FIG. 2B may be controlled by cryocooler controller 120 to reach stable operating temperatures, under typical heat loads, of approximately 77K to 120K, or higher temperatures depending on the application needs. More generally, various cryocooler arrangements (e.g., including cryocooler arrangements including and/or different from a split-pair Stirling refrigerator arrangement) may be controlled by cryocooler controller 120 to reach a wide range of stable operating temperatures, cooling powers, and/or subject to a wide variety of different size, power, and weight constraints.

Figure 3A:
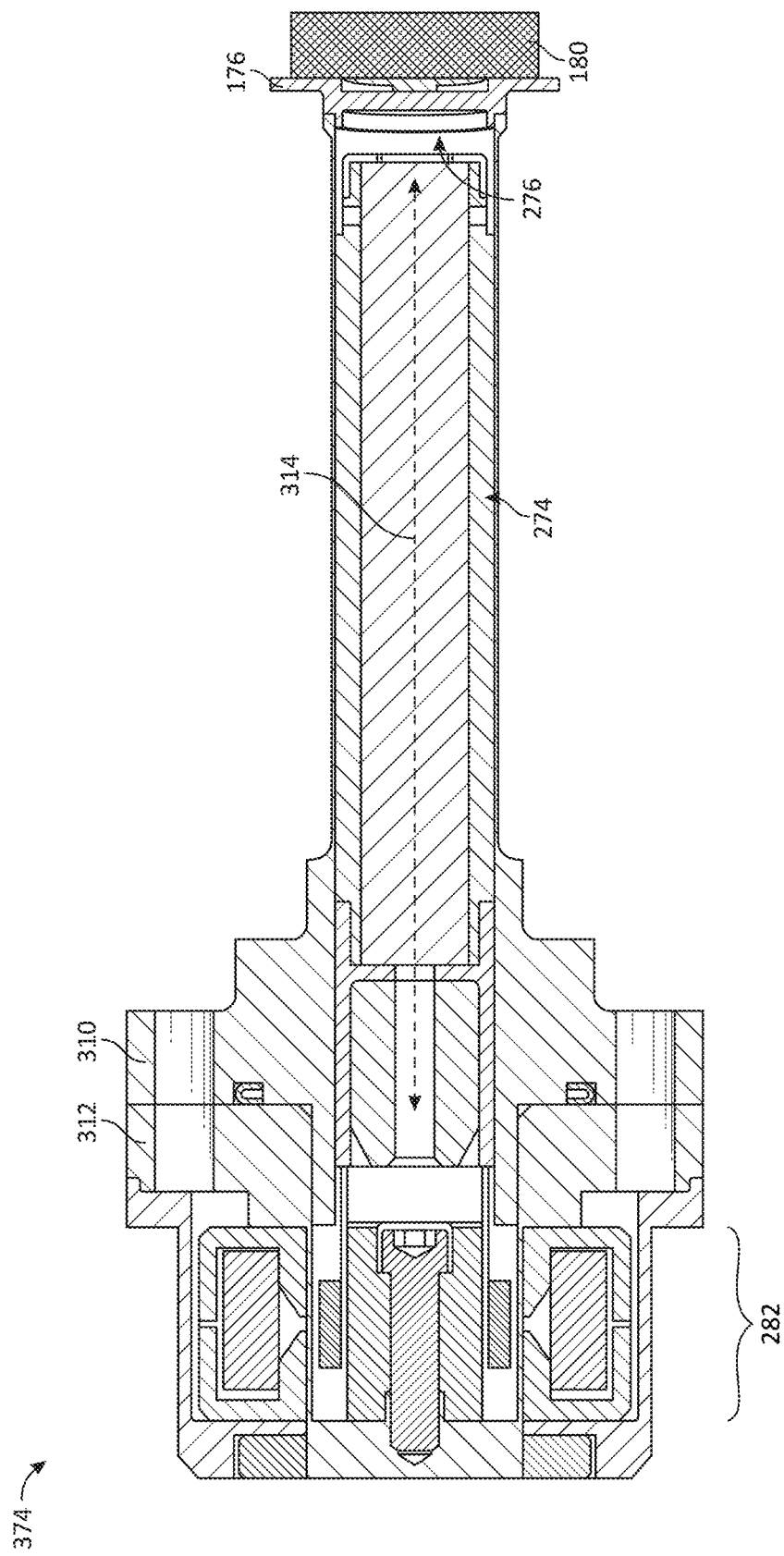
FIG. 3A illustrates a motorized expander for a refrigerator/cryocooler in accordance with an embodiment of the disclosure.

FIG. 3A illustrates a motorized expander 374 for refrigerator/cryocooler 170 in accordance with an embodiment of the disclosure. In various embodiments, motorized expander 374 may be implemented as a simplified form of actively balanced expander 174 and may be otherwise interchangeable with actively balanced expander 174. In the embodiment shown in FIG. 3A, motorized expander 374 includes displacer 274 disposed within cylinder 310 and configured to reciprocate along direction of motion 314 to help cool fluid (e.g., also flowing along direction of motion 314 but generally in an opposite direction relative to the instantaneous motion of displacer 274) flowing between motor/compressor 172 and expansion space 276 to cool electronic device 180, as described herein. Also shown in FIG. 3A is transducer system 282 disposed within cylinder head 312.

Figure 3B:
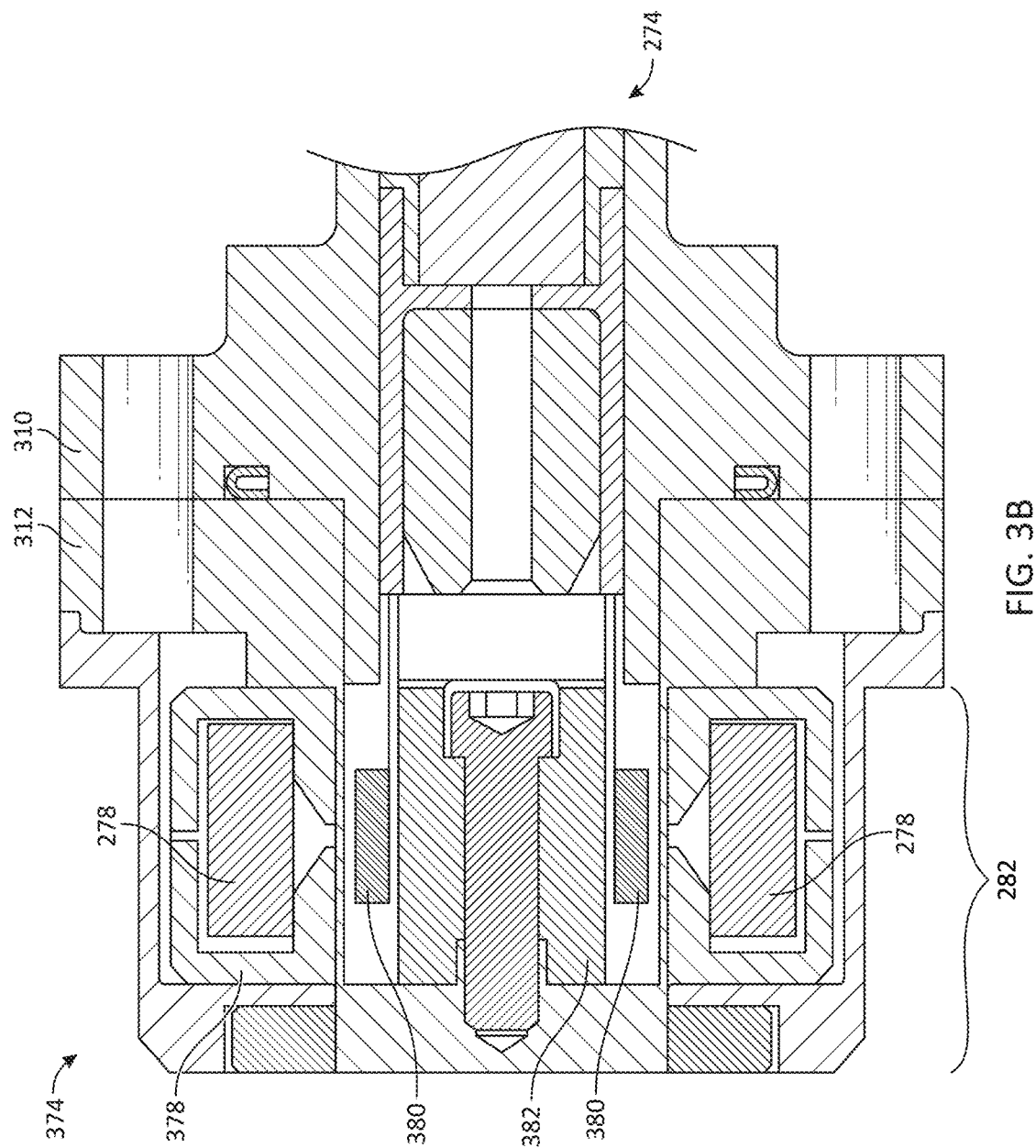
FIG. 3B illustrates a motorized expander for a refrigerator/cryocooler in accordance with an embodiment of the disclosure.

FIG. 3B illustrates additional detail of transducer system 282 for motorized expander 374 of refrigerator/cryocooler 170 in accordance with an embodiment of the disclosure. In the embodiment shown in FIG. 3B, transducer system 282 includes motor coil 278 secured to cylinder head 312, magnet ring 380 secured to displacer 274, and inner and outer yokes 382 and 378 configured to support magnet ring 380 and motor coil 278, respectively, and to provide a path of low reluctance for magnetic flux generated by motor coil 278 and magnet ring 380. In addition, motor coil 278 and inner and outer yokes 382 and 378 may be configured to provide passive mechanical vibration mitigation through their combined weight and secure mechanical link to cylinder 310 through cylinder head 312.

In various embodiments, transducer system 282 may provide benefits over conventional passive spring and bounce space systems (e.g., used to passively control motion of displacer 274) by eliminating the space required for such elements and by providing for the ability to control displacer amplitude and phase relative to pressure waves generated by motor/compressor 172. For example, cryocooler controller 120 may be configured to generate and provide motor drive signals over power leads 123 configured to operate displacer 274 according to an amplitude and/or phase relative to motor drive signals provided to motor/compressor 172 that minimizes risk of knock during cool down, decreases a cool down time, and/or increases a maximum cooling power for a particular input power level, relative to passive spring and bounce space systems. Feedback of operation of transducer system 282 may be provided by a back EMF measured at power leads 123, for example. Advantageously, embodiments of motorized expander 374 may be relatively compact due to the mechanical seal between displacer 274 also acting as a motor bearing for transducer system 282.

Figure 4A:
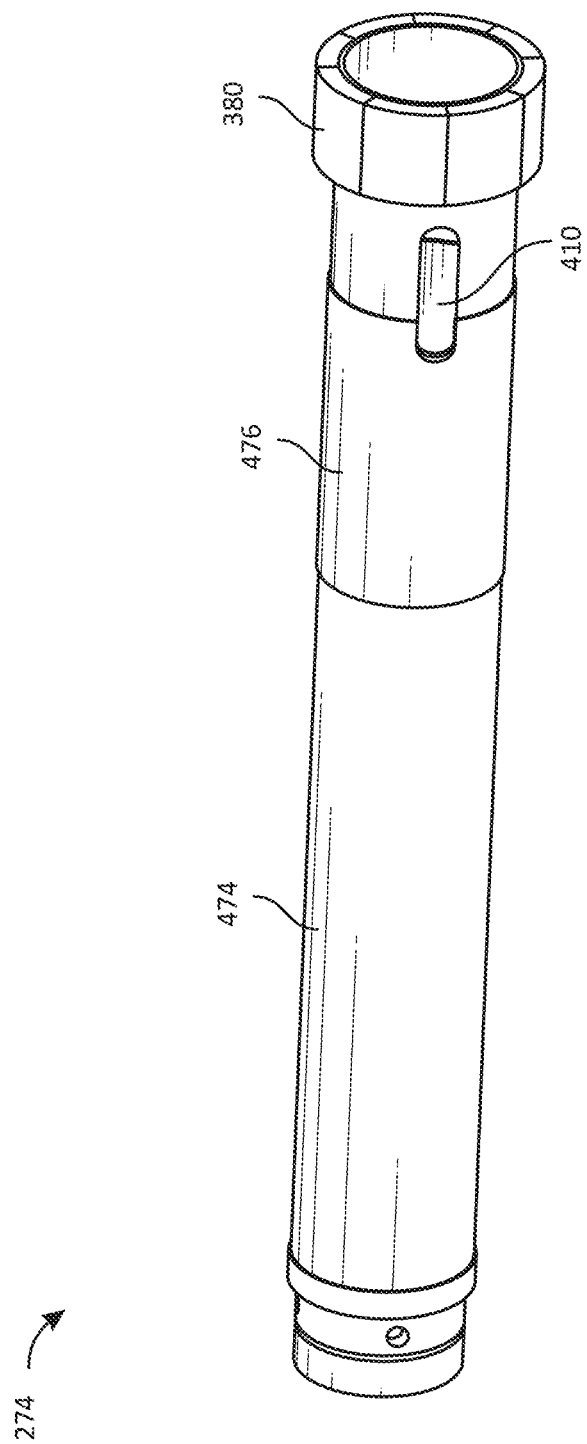
FIG. 4A illustrates a displacer for an actively balanced expander of a refrigerator/cryocooler in accordance with an embodiment of the disclosure.

FIG. 4A illustrates displacer 247 for actively balanced expander 174 of refrigerator/cryocooler 170 in accordance with an embodiment of the disclosure. In the embodiment shown in FIG. 4A, displacer 247 includes displacer body or piston 474, cylindrical support structure 476, which may act as both a seal and bearing surface for displacer 274, and magnet ring 380. Fluid from motor/compressor 172 may travel through fluid channel 410 into displacer body 474 to reach expansion space 276, for example, or the reverse, as shown in FIG. 2A. Magnet ring 380 may be implemented as a ring of permanent magnets secured to displacer 247 and configured to couple magnetically with a varying magnetic field generated by motor coil 278 to control mechanical motion of displacer 274.

Figure 4B:
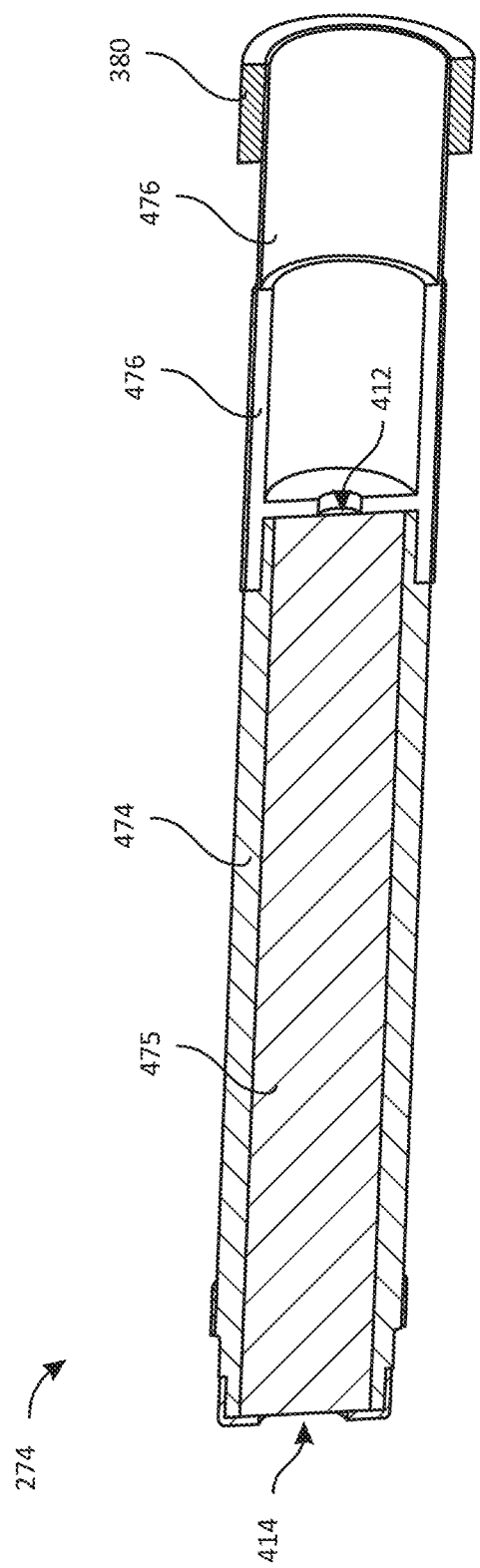
FIG. 4B illustrates a cross section of a displacer for an actively balanced expander of a refrigerator/cryocooler in accordance with an embodiment of the disclosure.

FIG. 4B illustrates a cross section of displacer 247 for actively balanced expander 174 of refrigerator/cryocooler 170 in accordance with an embodiment of the disclosure. As shown in FIG. 4B, displacer body 474 may be hollow and filled with a regenerator matrix 475 configured to extract, store, and inject heat into fluid flowing through regenerator matrix 475 (e.g., and through fluid orifices 412 and 414), depending on the relative motion of fluid within regenerator matrix 475. As can be seen more clearly in FIG. 4B, cylindrical support structure 476 can be formed to provide a seal and a bearing surface for displacer 274, to support magnet ring 380, and to support and align displacer body 474 with magnet ring 380 and the seal/bearing surface provided by cylindrical support structure 476.

Figure 5A:
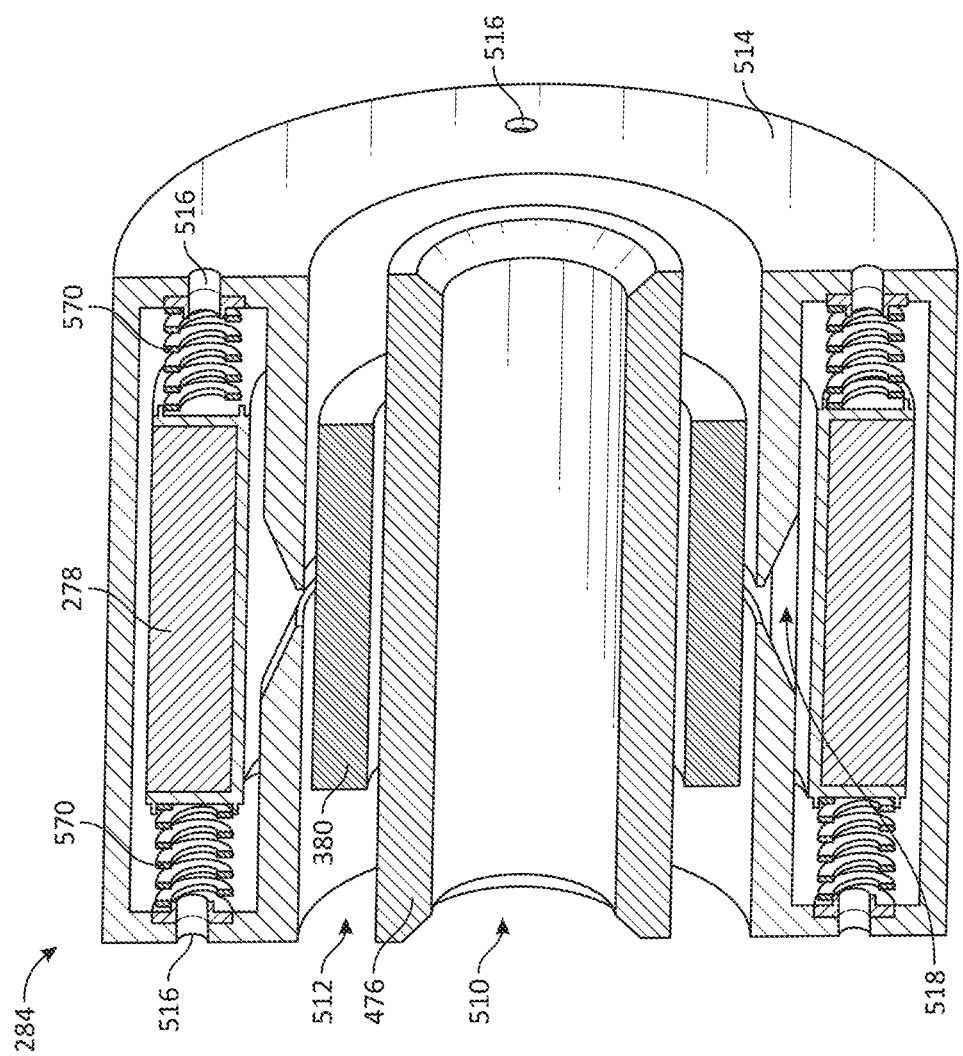
FIG. 5A illustrates a balancer system for an actively balanced expander of a refrigerator/cryocooler in accordance with an embodiment of the disclosure.

FIG. 5A illustrates a balancer system 284 for actively balanced expander 174 of refrigerator/cryocooler 170 in accordance with an embodiment of the disclosure. In the embodiment shown by FIG. 5A, balancer system 284 includes motor coil 278 suspended by springs 570 within motor coil support sleeve 514 of cylinder head 310 and magnet ring 380 supported by cylindrical support structure 476 of displacer 274. In typical operation, motor coil 278 is energized to generate a magnetic field that couples with magnet ring 380 to control motion of displacer 274, as in a linear motor arrangement as described herein, and to eliminate risk of impact of displacer 274 with cylinder head 312 and/or cold finger 176. Mechanical vibrations caused by linear motion of displacer 274 within cylinder 310 and magnet ring 380 within magnet sleeve space 512 of cylinder head 312 are dampened by compensating motion of motor coil 278, as controlled by motor driver signals provided to motor coil 278 and by a restoring force provided by springs 570. In various embodiments, springs 570 may be implemented by one or more active spring elements configured to control mechanical motion and/or damping of motion of motor coil 278 according to balancer system drive signals provided to balancer system 284. Electrical and/or cooling fluid access to each of the elements shown in FIG. 5A may be provided by one or more of access holes 516, magnet sleeve space channel 518, and hollow 510 of cylindrical support structure 476.

FIG. 5B illustrates a cross section of balancer system 284 for actively balanced expander 174 of refrigerator/cryocooler 170 in accordance with an embodiment of the disclosure. As shown in FIG. 5B, balancer system 284 may include an array of springs 570 distributed evenly across motor coil 278 within motor coil support sleeve 514 of cylinder head 310. Magnet ring 380 may be securely fixed to cylindrical support structure 476 of displacer 274 and be configured to reciprocate axially (e.g., into and out of the page, as shown in FIG. 5B) within magnet sleeve space 512 of cylinder head 312. Although FIG. 5B shows an array of 8 coil-type springs 570 on one side of motor coil 278, other spring arrangements are contemplated. For example, the array of springs may include between 2 and 16 springs, and each spring in the array may be identical, or a subset of the springs in the array may be of a different shape or type (e.g., leaf or other type or shape of spring). In some embodiments, two of the springs in the array may be active spring elements, and the remainder may be passive spring elements. In further embodiments, a single cylindrical spring approximately the same diameter of motor coil 278 may be used on one side of motor coil 278.

In some embodiments, one or more of springs 570 may be implemented by an adjustable spring and/or damping element (e.g., an "active spring element") controlled by balancer system drive signals to provide an adjustable amplitude, frequency, phase, and other characteristics of motion for motor coil 278 relative to displacer 274. Such active spring elements may be implemented as micro-electromechanical (MEMS) devices, for example, such as MEMS fluid valves configured to selectively restrict flow of fluid through holes 516 and channel 518 and/or within springs 570 to adjust a restoring and/or damping force generated by springs 570 and applied to motor coil 278. In other embodiments, such MEMS active spring elements may be configured to use electric fields (e.g., corresponding to balancer system drive signals) to generate restoring and/or damping forces.

By integrating both an active transducer and balancer into balancer system 284, embodiments provide a single piston actively balanced expander where motor coil 278 provides the balancer mass, motor coil 278 and magnet ring 380 are controlled to move substantially in opposite directions or with anti-sympathetic motion to dampen vibrations otherwise caused by motion of displacer 274, and springs 570 are used to provide an adjustable resonance frequency for expander 174 and, in some embodiments, to provide an electrical current path (e.g., to the active portions of springs 570 and/or to motor coil 278). Amplitude control of motion of motor coil 278 may be accomplished by adjusting a driving frequency of motor coil 278 relative to a driving frequency of motor/compressor 172, by adjusting a damping and/or restoring force of springs 570, and/or by incorporating additional electro or mechanical control systems that are integrated with balancer system 284.

Figure 6:
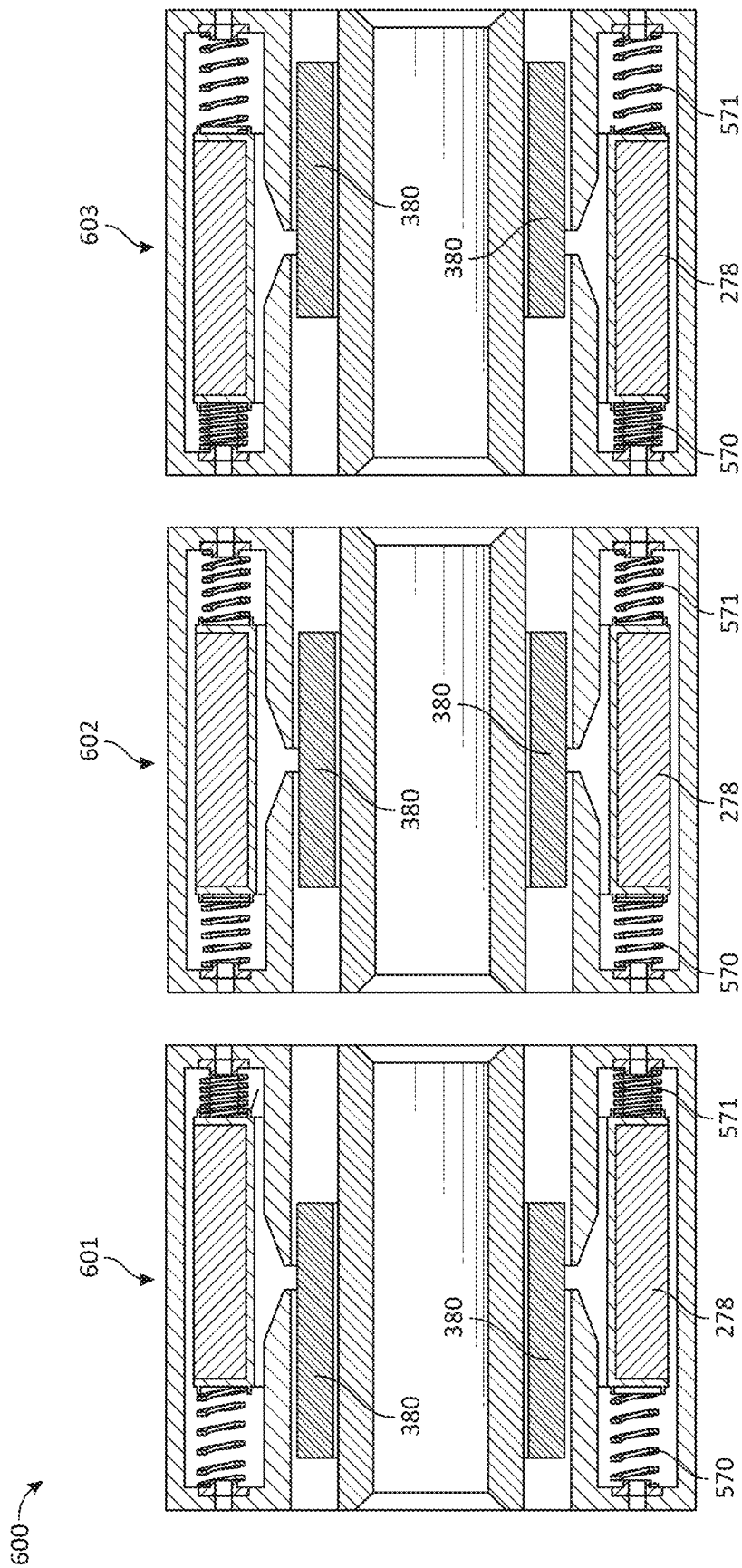
FIG. 6 illustrates operation of a balancer system for an actively balanced expander of a refrigerator/cryocooler in accordance with an embodiment of the disclosure.

FIG. 6 illustrates operation of balancer system 284 for actively balanced expander 174 of refrigerator/cryocooler 170 in accordance with an embodiment of the disclosure. In state 601, motor coil 278 is driving magnet ring 380 and displacer 274 to the left, thus generating a change in momentum to the left, and coils 570 and 571 are allowing motor coil 278 to move anti-sympathetically to generate a change in momentum in an opposite direction and thereby reduce any mechanical vibration transferred to electronic device 180. As shown in state 601, springs 570 (stretched) and 571 (compressed) have been controlled to allow or control suspended motor coil 278 to move anti-sympathetically to the right with enough amplitude and acceleration to reduce or eliminate the aggregate change in momentum of displacer 274 and motor coil 278. In various embodiments, springs 570 and 571 may be configured to apply a damping force to motion of motor coil 278, increasingly as it approaches either end of 514, to reduce risk of impact with motor coil support sleeve 514 or sudden deceleration of motor coil 278 that might cause increased mechanical vibrations within expander 174.

In state 602, motor coil 278 is driving magnet ring 380 and displacer 274 to the right, thus generating a change in momentum to the right, and coils 570 and 571 are allowing motor coil 278 to move anti-sympathetically to the left to generate a change in momentum in an opposite direction and thereby reduce any mechanical vibration transferred to electronic device 180. As shown in state 602, springs 570 and 571 have been controlled to allow suspended motor coil 278 to move anti-sympathetically to the left with enough amplitude to reduce or eliminate the aggregate change in momentum of displacer 274 and motor coil 278. In state 603, motor coil 278 is driving magnet ring 380 and displacer 274 further to the right, thus generating a change in momentum to the right, and coils 570 (compressed) and 571 (stretched) are allowing motor coil 278 to move anti-sympathetically further to the left to generate a change in momentum in an opposite direction and thereby reduce any mechanical vibration transferred to electronic device 180. As shown in state 603, springs 570 and 571 have been controlled to allow suspended motor coil 278 to move anti-sympathetically with enough amplitude to reduce or eliminate the aggregate change in momentum of displacer 274 and motor coil 278.

Figure 7:
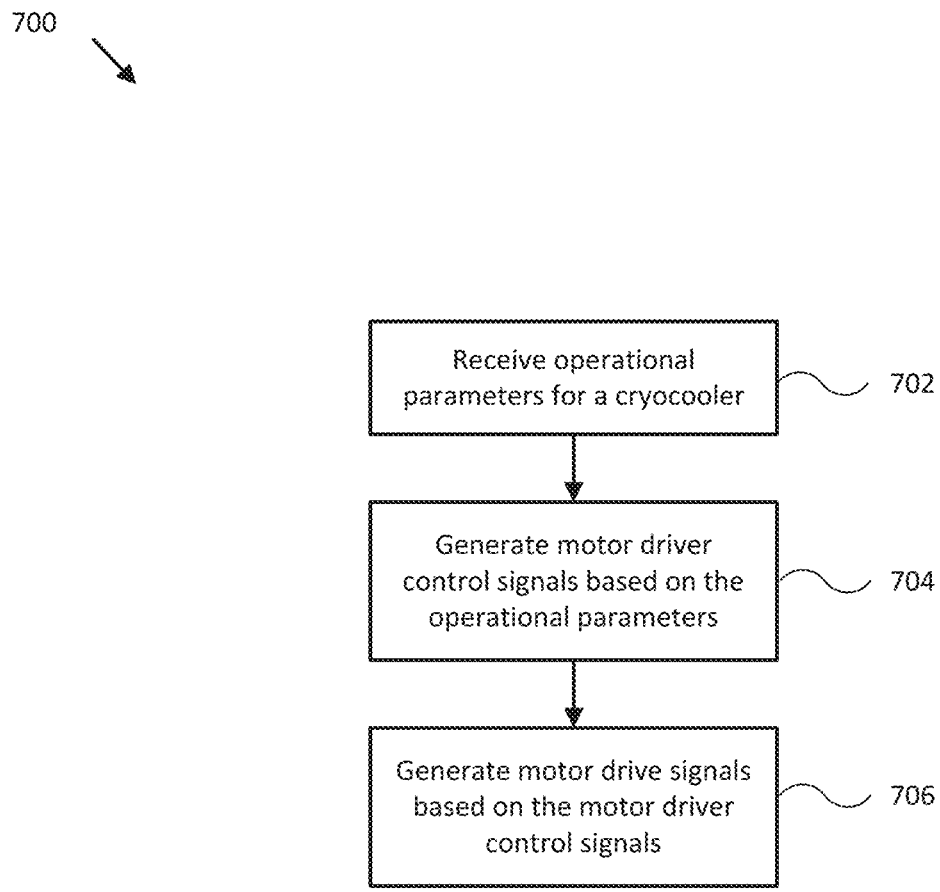
FIG. 7 is a flowchart illustrating a method for operating a refrigerator/cryocooler in accordance with an embodiment of the disclosure.

FIG. 7 is a flowchart illustrating a method 700 for operating a refrigerator/cryocooler with an actively balanced expander in accordance with an embodiment of the disclosure. One or more portions of process 700 may be performed by cryocooler controller 120 and utilising any elements of systems, components, logic, or methods described with reference to FIGS. 1-6. It should be appreciated that any step, sub-step, sub-process, or block of process 700 may be performed in an order or arrangement different from the embodiment illustrated by FIG. 7. In some embodiments, any portion of process 700 may be implemented in a loop so as to continuously operate, such as in a control loop, for example.

At block 702, operational parameters for a cryocooler are received. For example, motor driver controller 130 of cryocooler controller 120 may be configured to receive operational parameters from user interface 110 and/or a memory (other modules 122), such as a temperature set point corresponding to a desired temperature for cold finger 176 and/or FPA 182. In some embodiments, motor driver controller 130 may also be configured to receive feedback data corresponding to operation of cryocooler 170 from feedback interface 132. Feedback interface 132 may be configured to receive one or more sensor signals (e.g., from temperature sensors 134 and/or other sources) and generate corresponding feedback data to be delivered to motor driver controller 130, as described herein.

At block 704, motor driver control signals based, at least in part, on operational parameters for a cryocooler are generated. For example, motor driver controller 130 of cryocooler controller 120 may be configured to generate motor driver control signals for cryocooler 170 based, at least in part, on operational parameters received in block 702. In some embodiments, motor driver controller 130 may be configured to generate motor driver control signals based, at least in part, on feedback data and/or operational parameters received in block 702. For example, motor driver controller 130 may be configured to determine feedback errors based, at least in part, on a set point corresponding to a desired temperature for cold finger 176 and/or electronic device 180 and feedback data corresponding to a measured temperature of cold finger 176 and/or electronic device 180. Motor driver controller 130 may then generate motor driver control signals based, at least in part, on the determined feedback error.

In further embodiments, motor driver controller 130 may be configured to generate motor driver control signals and balancer system control signals based, at least in part, on operational parameters received in block 702. For example, motor driver controller 130 may be configured to determine feedback errors based, at least in part, on a set point corresponding to a desired temperature for cold finger 176 and/or electronic device 180 and feedback data corresponding to a measured temperature of cold finger 176 and/or electronic device 180. Motor driver controller 130 may then generate motor driver control signals and balancer system control signals based, at least in part, on the determined feedback error.

At block 706, motor drive signals based on motor driver control signals are generated. For example, motor driver controller 130 of cryocooler controller 120 may be configured to provide motor driver control signals generated in block 704 to motor driver 140. In further embodiments, motor driver controller 130 of cryocooler controller 120 may be configured to provide motor driver control signals and balancer system control signals generated in block 704 to motor driver 140. Motor driver 140 may then provide corresponding motor drive signals and/or balancer system drive signals to motor compressor 172, suspended motor coil 278, and/or springs 570 to control operation of cryocooler 170, as described herein.

Although embodiments described herein are primarily directed to motorized and balanced expanders/refrigerators, similar techniques may be used to reduce the size and mechanical vibrations generated by a compressor of a refrigeration system (e.g., motor/compressor 172). For example, motor/compressor 172 in FIG. 2A may be modified to have only one piston and to employ a balancing system with one or more springs, similar in function and arrangement to balancing system 284 shown in FIGS. 5A-B.

Conventionally, linear Stirling coolers are typically equipped with symmetric dual opposed motor-piston compressors to reduce mechanical vibrations, where the motion of one piston is compensated for by opposite motion of the other piston. By contrast, a compact single piston compressor equipped with an active balancer can be a low cost and compact alternative, especially if the motor components provide a major portion of the balancer structure itself. As described herein, a motor coil of a self-balanced motor may be used as an active counterbalance mass suspended in an axially movable fashion. Motor coil and magnet/piston may be driven to oscillate generally in opposite or anti-sympathetic directions because both components may be electrodynamically driven and/or coupled to each other. Motor vibrations, typically caused by the oscillating magnet/piston and the changes in momentum of connected components, may be substantially reduced or eliminated by superposing an appropriately driven change in momentum of the oscillating suspended motor coil.

Benefits of such systems include cost reduction over conventional methods: on the compressor side, embodiments provide a low-cost and relatively compact alternative to dual opposed piston configurations. The parts count is substantially reduced by using only one instead of two piston assemblies, while meeting or surpassing vibration related application requirements. Furthermore, costs for the counterbalance function are reduced and structural complexity minimized by sharing already existing motor components; the motor coil is also functioning as a counterbalancing mass. On the expander side, a solution is provided which significantly reduces mechanical vibrations that occur substantially at the cold finger and are more difficult to damp using conventional means.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a cryocooler comprising:
a displacer; and
a magnetic system comprising a motor coil and a magnet configured to couple magnetically with a varying magnetic field generated by the motor coil to control a motion of the displacer;
wherein in response to the varying magnetic field generated by the motor coil, both the motor coil and the magnet reciprocate to move in opposite directions from each other; and
a cryocooler controller comprising:
a motor driver controller configured to receive operational parameters corresponding to a desired operational state of a cryocooler controlled by the cryocooler controller and generate control signals based, at least in part, on the received operational parameters; and
a motor driver configured to receive the control signals from the motor driver controller and generate coil signals based, at least in part, on the control signals, to cause the motor coil to generate the varying magnetic field.

2. The system of claim 1, wherein the cryocooler controller further comprises:
a feedback interface configured to receive one or more sensor signals and generate feedback data corresponding to operation of the cryocooler, wherein the motor driver controller is configured to receive the feedback data from the feedback interface and generate the control signals based, at least in part, on the feedback data and the operational parameters.

3. The cryocooler controller of claim 2, wherein:
the one or more sensor signals comprise a measured temperature of a cold finger of the cryocooler and/or an electronic device thermally coupled to the cryocooler;
the motor driver controller is configured to determine a feedback error based, at least in part, on a set point corresponding to a desired temperature for the cold finger of the cryocooler and/or the electronic device and feedback data corresponding to the measured temperature of the cold finger of the cryocooler and/or the electronic device; and
the motor driver controller is configured to generate the control signals based, at least in part, on the determined feedback error.

4. The cryocooler controller of claim 1, wherein:
the cryocooler comprises one or more springs configured to suspend the motor coil within a motor coil support sleeve of the cylinder head and provide for and/or control anti-sympathetic motion of the motor coil within the motor coil support sleeve relative to the displacer.

5. The cryocooler controller of claim 4, wherein:
at least one of the one or more springs comprises an active spring element configured to generate an adjustable restoring and/or damping force corresponding to the control signals generated by the motor driver controller.

6. The cryocooler controller of claim 4, wherein:
at least one of the one or more springs is configured to provide an electrical current path to the motor coil.

7. The cryocooler controller of claim 4, wherein:
the anti-sympathetic motion and mass of the motor coil is configured to reduce or eliminate mechanical vibrations otherwise generated by motion of the displacer.

8. A system comprising a cryocooler comprising:
a piston; and
a magnetic system comprising a motor coil and a magnet configured to couple magnetically with a varying magnetic field generated by the motor coil to control a motion of the piston;
wherein in response to the varying magnetic field generated by the motor coil, both the motor coil and the magnet reciprocate to move in opposite directions from each other.

9. The system of claim 8, further comprising one or more springs connected to the motor coil to limit a reciprocating motion of the motor coil.

10. The system of claim 8, further comprising:
an electronic device thermally coupled to and at least partially cooled by the cryocooler, wherein the electronic device comprises at least a part of a sensor system or an infrared camera.

11. A method comprising:
receiving operational parameters corresponding to a desired operational state of a cryocooler controlled by a cryocooler controller;
generating control signals based, at least in part, on the received operational parameters; and
generating, by a motor driver of the cryocooler controller, coil signals based, at least in part, on the control signals, to cause a motor coil of the cryocooler to generate the varying magnetic field, wherein:
the cryocooler comprises:
a displacer; and
a magnetic system comprising the motor coil and a magnet configured to couple magnetically with a varying magnetic field generated by the motor coil to control a motion of the displacer;
wherein in response to the varying magnetic field generated by the motor coil, both the motor coil and the magnet reciprocate to move in opposite directions from each other.

12. The method of claim 11, further comprising:
receiving one or more sensor signals corresponding to operation of the cryocooler controlled by the cryocooler controller;
generating feedback data corresponding to the one or more sensor signals;
generating the control signals based, at least in part, on the feedback data and the operational parameters.

13. The method of claim 12, wherein the one or more sensor signals comprise a measured temperature of a cold finger of the cryocooler and/or an electronic device thermally coupled to the cryocooler, the method further comprising:
determining a feedback error based, at least in part, on a set point corresponding to a desired temperature for the cold finger of the cryocooler and/or the electronic device and feedback data corresponding to the measured temperature of the cold finger of the cryocooler and/or the electronic device; and
generating the control signals based, at least in part, on the determined feedback error.

14. The method of claim 11, wherein:
the cryocooler comprises one or more springs configured to suspend the motor coil within a motor coil support sleeve of the cylinder head and provide for and/or control anti-sympathetic motion of the motor coil within the motor coil support sleeve relative to the displacer.

15. The method of claim 14, wherein:
at least one of the one or more springs comprises an active spring element configured to generate an adjustable restoring and/or damping force corresponding to the control signals generated by the motor driver controller.

16. The method of claim 14, further comprising:
at least one of the one or more springs is configured to provide an electrical current path to the motor coil.

17. The method of claim 14, wherein:
the anti-sympathetic motion and mass of the motor coil is configured to reduce or eliminate mechanical vibrations otherwise generated by motion of the displacer.

18. The method of claim 11, further comprising cooling an electronic device thermally coupled to the cryocooler controlled by the cryocooler controller, wherein:
the motor of the cryocooler controlled by the cryocooler controller comprises a linear motor driven by the drive signals generated by the motor driver of the cryocooler controller; and
the electronic device comprises at least a part of a sensor system or an infrared camera.

19. The method of claim 18, wherein the electronic device comprises the infrared camera, and wherein a focal plane array of the infrared camera is thermally coupled to the cryocooler.

20. The method of claim 19, further comprising operating the infrared camera to capture infrared image data while the focal plane array is cooled by the cryocooler.

* * * * *